US00RE34319E

United States Patent [19]

Boutin et al.

[11] E Patent Number: Re. 34,319

[45] Reissued Date of Patent: Jul. 20, 1993

[54] DYNAMIC SEAL ARRANGEMENT FOR IMPELLER PUMP

[75] Inventors: Allan J. Boutin, Borden, Ind.; Daniel D. Ocheda, Park Ridge, Ill.

[73] Assignee: John Crane Inc., Morton Grove, Ill.

[21] Appl. No.: 796,794

[22] Filed: Nov. 25, 1991

Related U.S. Patent Documents

Reissue of:

[64] Patent No.: 4,884,945
Issued: Dec. 5, 1989
Appl. No.: 222,196
Filed: Jul. 21, 1988

[51] Int. Cl.[5] ..... F04D 29/14

[52] U.S. Cl. ..... 415/174.2; 415/171.1; 277/96.1; 277/93 SD

[58] Field of Search ..... 415/170.1, 171.1, 174.2, 415/174.3; 277/96.1, 93 SD, 93 R, 87

[56] References Cited

U.S. PATENT DOCUMENTS

| | | | |
|---|---|---|---|
| 2,258,527 | 10/1941 | Warman | 415/109 |
| 3,068,801 | 12/1962 | Murray | 415/109 |
| 3,395,645 | 8/1968 | Vilet | 415/175 |
| 4,212,475 | 7/1980 | Sedy . | |
| 4,290,611 | 9/1981 | Sedy . | |

FOREIGN PATENT DOCUMENTS 297381 8/1990 European Pat. Off. .

*Primary Examiner*—John T. Kwon
*Attorney, Agent, or Firm*—Kinzer, Plyer, Dorn, McEachran & Jambor

[57] ABSTRACT

An impeller pump including a housing defining a seal cavity having a shaft rotatably mounted therein, and an expeller to pump fluid from the seal cavity. A dynamic seal provides a fluid tight seal between the housing and the shaft. The seal comprises an axially movable primary seal ring which rotates with the shaft and a mating stationary seal ring, both rings disposed annularly of the shaft and each defining a generally radial sealing face adapted to seal against the other. A biasing device urges the primary seal ring into sealing engagement with the mating seal ring. The radial face of the mating seal ring defines a plurality of spiral grooves and a sealing dam area which is at the periphery of the ring exposed to high pressure. When the pump is not operating, the seal ring faces contact one another and the dam provides a seal against the opposing face. When the pump is operating, the primary seal ring rotates with the shaft and the grooves create a pumping action to pump air between the faces causing the primary seal ring to lift away from the mating seal ring to prevent wear and avoid undue heat generation.

22 Claims, 2 Drawing Sheets

FIG. 3
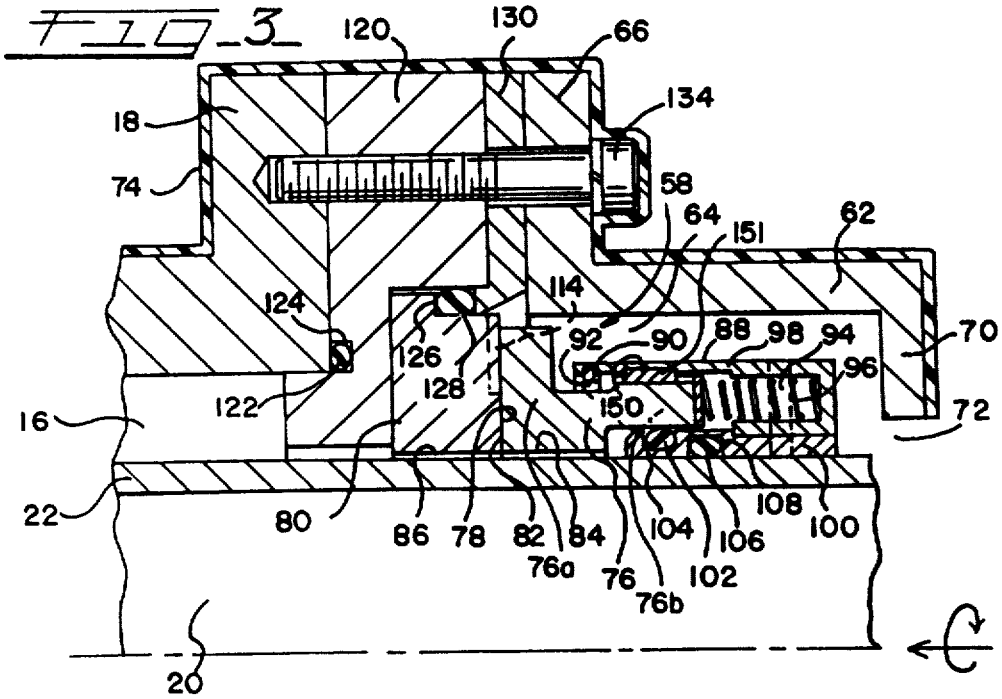
FIG. 4
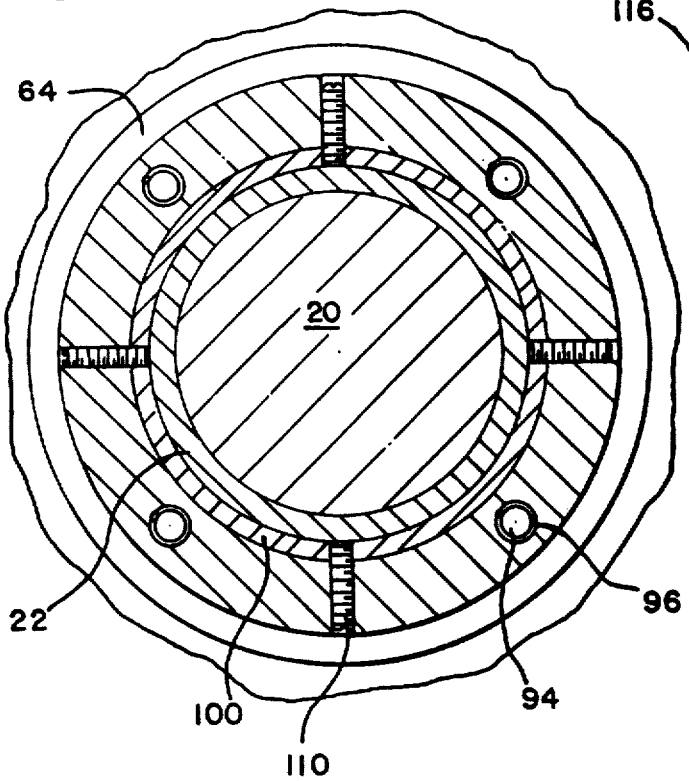
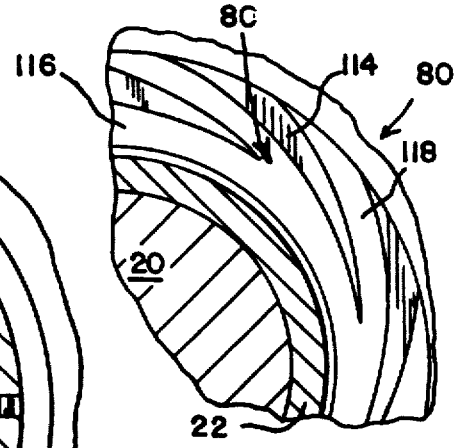
FIG. 5

DYNAMIC SEAL ARRANGEMENT FOR IMPELLER PUMP

Matter enclosed in heavy brackets [ ] appears in the original patent but forms no part of this reissue specification; matter printed in italics indicates the additions made by reissue.

BACKGROUND OF THE INVENTION

This invention relates to dynamic seals for containing fluid under pressure between a housing and a shaft adapted to be rotated relative to the housing. More particularly, it relates to such seals for pumps which include an expeller or repeller that pumps the sealed fluid away from the seal cavity during pump operation. Dynamic seals are used to establish a leak-proof barrier between stationary housing and rotatable shaft components. One typical form of dynamic seal has annular sealing rings respectively sealed and keyed relative to the housing and to the shaft. The relative rotation takes place across annular sealing faces formed on the sealing rings, and the sealing faces are adapted to cooperate closely with and be biased against one another, to minimize fluid leakage between the faces. The mutually sliding sealing faces generate friction, possible overheating problems and wear.

In certain pumps for liquids an expeller on the rear face of the pump impeller is used to pump liquid from the seal area. The expeller operates somewhat as an impeller, to evacuate the liquid away from the rotating shaft and create a back pressure sufficient to overcome the contained liquid pressure.

In operation, the relative pressures are such that the impeller draws substantially all fluid from the seal area and delivers it to the pump outlet. In such applications, no particular dynamic shaft seal is required during the operating mode since no fluid can leak along the shaft. When the pump shaft is stationary, however, as when shut down, a physical barrier to leakage along the shaft is required.

Expellers thus have great appeal in containing liquid having a high degree of internal abrasion, as no dynamic seal need be used when the shaft is rotating. However, as soon as the shaft rotation is stopped, making the expeller ineffective, some form of dynamic seal may be needed.

SUMMARY OF THE INVENTION

The present invention provides an impeller pump including a rotatable shaft, a pump housing defining a seal cavity surrounding the shaft and an expeller pump to pump fluid from the seal cavity during pump operation. A dynamic seal arrangement is provided to seal between the pump housing and the shaft when the pump is not operating. The dynamic seal includes an axially movable primary seal ring secured in fluid tight relation to the shaft and a stationary mating seal ring secured in fluid tight relation with the housing. Both seal rings are disposed annularly of the shaft and define radial faces adapted for sealing contact with each other. The radial face of primary seal ring is flat and smooth. The radial face of the mating seal ring is smooth and defines a plurality of spiral grooves which extend inwardly from a circumferential periphery exposed to ambient fluid external to the pump and extending radially partially toward, but short of, the other circumferential periphery, so as to define a smooth sealing dam adapted to sealingly engage the radial face of the primary seal ring.

BRIEF DESCRIPTION OF THE DRAWINGS

FIG. 3 is a side sectional view of an alternate embodiment of the dynamic seal arrangement of the present invention.

FIG. 4 is a cross-sectional view of the dynamic seal arrangement shown in FIG. 2 taken along lines 4—4.

FIG. 5 is a cross-sectional view of the dynamic seal arrangement shown in FIG. 2 taken along lines 5—5.

DETAILED DESCRIPTION OF THE INVENTION

Figure 1:
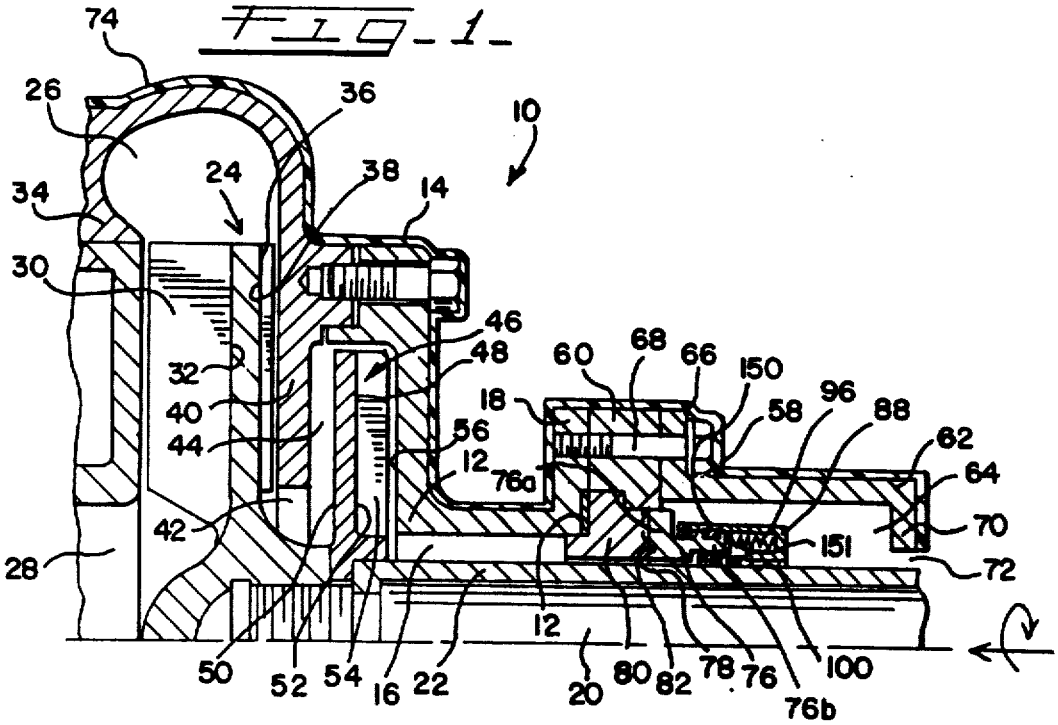
FIG. 1 is a side sectional view of the pump and dynamic seal arrangement of the present invention.

A known impeller pump, generally designated by the numeral 10, is shown in FIG. 1. The pump 10 includes a housing 12 having a circular wall 14 and defining an interior bore 16 and an annular flange 18. A shaft 20 is rotatably mounted in the housing bore 16 and has a sleeve 22 disposed thereabout and keyed thereto so that the sleeve 22 rotates with the shaft 20.

A main impeller 24 is disposed within an impeller cavity region 26 and is keyed to rotate with the shaft 20. Liquid to be pumped enters the impeller 24 at a central inlet region 28. Radial vanes 30 extending from the front face 32 of the impeller 24 centrifically dispel the fluid radially outwardly to an outlet region 34. Radial vanes 36 also extend from the rear face 38 of the impeller 24 which is spaced from an adjacent radial wall 40 of the housing 12. The radial wall 40 defines an annular cavity region 42 which is in fluid communication with the impeller cavity 26 and in fluid communication with the housing bore 16 via an expeller impeller cavity region 44.

An expeller, generally designated by the numeral 46 is disposed within the expeller impeller cavity region 44 of the housing 12 and is keyed to rotate with the shaft 20. The expeller 46 defines an expeller impeller 48 whose smooth front face 50 is disposed radially of the annular cavity 42 and spaced from, but adjacent, the radial housing wall 40. The rear face 52 of the expeller impeller 48 is provided with radial vanes 54 extending therefrom, the vanes 54 spaced from, but proximately adjacent the housing wall 56.

Fluid leakage can occur between the main impeller 10 and the radial housing wall 40 via the annular cavity region 42 to the shaft bore 16. The expeller 46 is provided to counteract this fluid movement, at least when the pump 10 is operating, to pump fluid from the annular cavity 42 to the pump outlet 34. When the shaft 20, the main impeller vanes 30 and 36, and the expeller impeller vanes 54 all are rotating, the outward centrifical action of the pumped liquid is away from the annular cavity region 42 and the shaft bore 16 and directed toward the outlet region 34 of the pump 10. This minimizes or even totally eliminates fluid leakage from the pump housing along shaft 16. No seal mechanism to prevent leakage along shaft 20 is needed when the pump is operating. However, when the shaft 20 ceases to rotate, the shaft bore 16 and the annular cavity region 42 become flooded and fluid leakage can occur directly between the housing 12 and the shaft 20.

Figure 2:
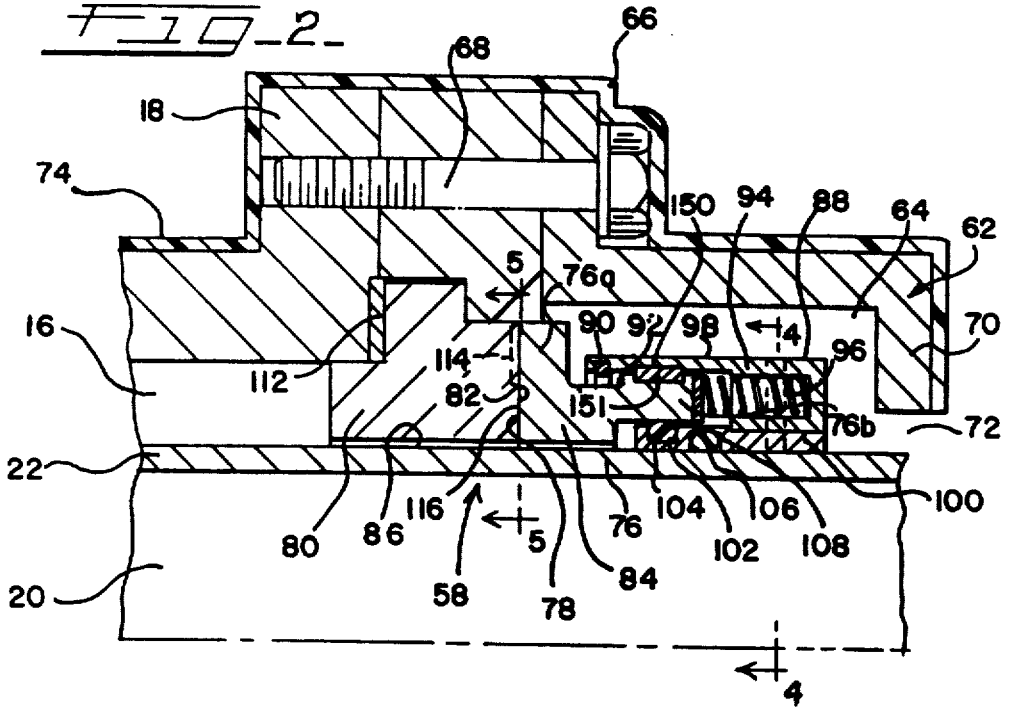
FIG. 2 is a side sectional view on an enlarged seal of the dynamic seal arrangement of FIG. 1.

As seen in FIGS. 1 and 2, an annular gland plate 60 is disposed adjacent the annular flange 18 of the pump housing 12. A seal housing 62, defining an annular seal cavity region 64 through which the shaft 20 extends, is provided. The seal housing 62 defines an outwardly depending flange 66 at one end thereof. Bolts 68 are inserted through the flange 66 of the seal housing 62, the gland plate 60, and the flange 66 of the pump housing 12, thereby connecting them in secure relation. The end of the seal housing 62 opposite the flange 66 provides a radial wall 70 defining an opening 72 at the lower periphery thereof which vents the seal cavity region 64 to atmosphere. A rubberized protective coating 74 covers the outer surfaces of both the pump housing 12 ad the seal housing 62. This coating is indicative of pumps used in corrosive environments.

The dynamic face seal of the present invention, designated generally by the numeral 58, includes an annular rotating primary seal ring 76 having a radially extending face 78 and an annular stationary or non-rotating mating seal ring 80 having a radially extending face 82. The radial faces 78 and 82 are disposed adjacent one another in sealing relation. The rings 76 and 80 are disposed about the shaft sleeve 22 and shaft 20 such that the surfaces 84 and 86, respectively, of the inner peripheries are adjacent, but do not contact, the shaft sleeve 22.

The primary seal ring 76 includes a face portion 76a and an axially expanded body portion 76b and is axially movable and held in place by an annular retainer 88 disposed in the seal cavity region 64, as best seen in FIGS. 2 and 3. The radial face 78 of the primary seal ring 76 is smooth and flat across its entire surface. A snap ring 90 is received in an annular groove 92 in the retainer 88 and holds the body portion 76b of the primary seal ring 76 within the retainer 88. The retainer 88 defines a plurality of bores 94 equally spaced about the circumference of the retainer 88, as best seen in FIG. 4. Springs 96 are seated in the bores 94 and act against an annular disc 98 to urge the primary seal ring 76 into engagement with the mating seal ring 80 and provide for axial movement of the primary seal ring 76. Retainer 88 may have one or more internal grooves 150 and the body portion 76b of the primary seal ring 76 an equal number of aligned grooves. Drive pins 151 are disposed to engage both the retainer 88 and primary seal ring body portion 76b to provide driving engagement without interference with axial movement. A generally cylindrical retainer sleeve 100 is disposed about the shaft sleeve 22 such that it is positioned between the shaft 20 and the retainer 88 and primary seal ring 76. An O-ring 102 is received in an annular groove 104 defined about the outer periphery of the sleeve 100 to provide a seal between the primary seal ring 76 and the sleeve 100. Another O-ring 106 is received in an annular groove 108 defined about the inner periphery of the sleeve 100 to provide a seal between the shaft sleeve 22 and the retainer sleeve 100. Set screws 110, as best seen in FIG. 4, extend through the retainer 88, retainer sleeve 100 and shaft sleeve 22 to secure them to the shaft 20 so that they, and consequently, the primary seal ring 76, rotate with the shaft 20. The shaft 20 rotates in a clockwise direction when viewing the pump 10 from the right, as indicated in FIGS. 2 and 3.

The mating seal ring 80 is fixed with respect to the flange 18 of the housing 12 and the gland plate 60 so that it is precluded from rotating with the shaft 20. A gasket 112 provides a seal between the housing 12 and the mating seal ring 80. As best seen in FIG. 5, the radial face 82 of the mating seal ring 80 defines a plurality of spiral grooves 114 which extend inwardly from the outer periphery thereof to a dam 116 defined at the inner periphery thereof. The width of the grooves 114 converge as they near the dam 116. A land 118 separates each groove 114. In the illustrated embodiment, the outer circumferential peripheries of rings 76 and 80 are exposed to low or ambient pressure external to the pump and the inner circumferential peripheries are exposed to the pressure of the fluid being pumped. The grooves are formed at the circumferential periphery of ring 80 exposed to low pressure and extend toward, but short of, the circumferential periphery exposed to the pressure in the pump such that the grooves extend from the outside diameter of the circle defined by the boundary between the grooved area and the smooth area of the face 82 to the circumferential periphery exposed to ambient pressure and the dam 116 extends from the internal diameter of the circle to the circumferential periphery exposed to low pressure.

FIG. 3 shows an alternate embodiment for mounting the mating seal ring 80. A gland plate 120 is keyed to the flange 18 of the housing 12 and an O-ring 122 received in an annular groove 124 defined in the gland plate 120 seals against leakage between the housing flange 18 and the gland plate 120. The gland plate 120 defines an annular recess 126 in which the mating seal ring 80 is disposed. An O-ring 128 provides a seal between the gland plate 120 and the mating seal ring 80. A second gland plate 130 is keyed to the gland plate 120 so that the mating seal ring 80 is retained between the gland plate 120 and the second plate 130. Bolts 134 secure the second gland plate 130, the gland plate 120 and the housing flange 18.

During operation of the impeller pump 10, the expeller 46 evacuates liquid from the annular cavity region 44 and the shaft bore region 16 eliminating the need for a seal along the shaft 20. The seal faces 78, 82 are therefore adapted to be separated during pump operation. Shaft 20 and primary seal ring 76 rotate, causing pumping action between the faces because of the spiral grooves 114 defined on the radial seal face 82 of the mating seal ring 80. This causes low pressure or ambient fluid external to the pump to enter between the faces 78 and 82 and the face 78 of the primary seal ring 76 to lift away from the face 82 of the mating seal ring 80 against the biasing effect of the springs 96 in the retainer 88 so the primary seal ring 76 is moved axially with respect to the shaft 20 and retainer 88. This reduces the drag, eliminates wear of the faces 78, 82 and prevents undue heat generation.

However, when the pump 10 is not operating, liquid may leak into the annular cavity region 44, the shaft bore region 16 and the annular seal cavity region 64. Therefore, it is desirable to seal off these regions. When the shaft 20 stops rotating, the primary seal ring 76 no longer pumps air into the spiral grooves 114 of the mating seal ring 80. The springs 96 in the primary seal ring retainer 88 axially urge the radial face 78 of the primary seal ring 76 into engagement with the radial face 82 of the mating seal ring 80, particularly the dam 116 thereof, thereby providing a static seal against fluid leakage.

The primary seal ring 76 may be made of carbon and the mating seal ring 80 may be made of silicon carbide. The O-rings 102, 106, 122, and 128 may be formed of an elastomer such as Viton ®, a registered trademark of E. I. DuPont, de Nemours & Co., and the gasket 112 may be formed of Chemlon. The other structural components, as the shaft 20, the shaft sleeve 22, the pump housing 12, the seal housing 62, the gland plates 60, 120, 130, the retainer 88, the springs 114, the snap ring 90 and the disc 98, may be made of stainless steel.

While the above described embodiment discloses a primary seal ring 76 having a smooth radial face 78 and a mating seal ring 80 having a radial face 82 defining spiral grooves 114 thereacross, it will be understood that the radial face 78 of the primary seal ring 76 may define spiral grooves and the radial face 82 of the mating seal ring 80 may be smooth.

The disclosed seal arrangement 58 of the present invention may have particular utility in containing acid slurries, lime slurries, caustic cleaning solutions, sandy water, sludge or even corn syrup.

Thus, it has been shown that the present invention provides a dynamic seal for an impeller pump to seal against the leakage of liquid when the pump is not operating.

Various features of this invention have been particularly shown and described in connection with the illustrated embodiment of the invention. However, it must be understood that these particular arrangements merely illustrate and that the invention is to be given its fullest interpretation within the terms of the appended claims.

What is claimed is:

1. In a pump including a rotatable shaft, an impeller on said shaft to pressurize fluid during rotation of said shaft, a pump housing defining a seal cavity surrounding the shaft, means sealing said shaft and housing against fluid leakage therebetween during said pumping operation and when said shaft is not rotating said means comprising, in combination, an expeller rotatable with said shaft to evacuate fluid from the seal cavity during pump operation, thereby eliminating the need for a fluid tight seal between said housing and said shaft during said pumping operation, a dynamic seal arrangement for providing a seal between said pump housing and said shaft when said shaft is not rotating, said seal arrangement comprising:

(a) an axially movable primary seal ring adapted to be disposed annularly about said shaft and secured in fluid tight relation to one of said shaft and said housing, said primary seal ring defining a radial seal face;

(b) a stationary mating seal ring adapted to be disposed annularly about said shaft and secured in fluid tight relation to the other of said shaft and said housing, said mating seal ring defining a radial seal face adapted for sealing contact with said radial seal face of said primary seal ring;

wherein one of said radial faces of one said seal ring defines a smooth surface and the radial seal face of said other seal ring defines a surface having a plurality of spiral grooves therein, said faces being exposed to the fluid within the pump at one circumferential periphery and to the atmosphere external to the pump at the opposite circumferential periphery, said grooves extending from said circumferential periphery exposed to atmosphere external to the pump radially partially toward the other circumferential periphery thereof and terminating to define on said surface of said radial face, between said grooves and said circumferential periphery[,] exposed to [atmosphere external to] *the fluid within* the pump a sealing dam adapted to sealingly engage said smooth radial face of said other of said seal rings;

biasing means urging said axially movable ring toward said stationary mating seal ring to cause said dam to engage said radial face of said other ring when said pump shaft is not rotating;

said grooves pumping atmosphere between said faces when said pump shaft is rotating at operational speed at a pressure to separate said radial faces of said seal rings.

2. In a pump, the seal arrangement of claim 1 wherein the width of said spiral grooves converges as they extend from said circumferential periphery toward said other circumferential periphery.

3. In a pump, the seal arrangement of claim 1 wherein said stationary ring is secured in fluid tight relation with said housing.

4. In a pump, the seal arrangement of claim 1 wherein said axially movable ring is secured in fluid tight relation with said shaft.

5. In a pump, the seal arrangement of claim 1 wherein said spiral grooves extend from the outside diameter of the circle defined by the boundary between the grooved area and the smooth area of said face to said circumferential periphery and the dam extends from the internal diameter of said circle to said other circumferential periphery.

6. In a pump, the seal arrangement of claim 1 including an annular seal housing disposed about said shaft and defining a seal housing cavity within which said seal arrangement is disposed, said seal housing connectable to said pump housing.

7. In a pump, the seal arrangement of claim 6 wherein said seal housing defines a radial wall defining an annular opening about said shaft to vent said seal housing cavity to atmosphere.

8. In a pump, the seal arrangement of claim 1 including a retaining element associated with said primary seal ring and retaining said primary seal ring therein, said retaining element disposed annularly about and rotatable with said shaft and defining a plurality of bores, each said bore having seated therein a spring, said spring adapted to bias said primary seal ring into engagement with said mating seal ring to provide a static seal.

*9. In a pump including a rotatable shaft, an impeller on said shaft to pressurize fluid during rotation of said shaft, a pump housing defining a seal cavity surrounding the shaft, means sealing said shaft and housing against fluid leakage therebetween during said pumping operation and when said shaft is not rotating said means comprising, in combination, means to maintain the fluid being pumped away from the seal cavity during pump operation, thereby eliminating the need for a fluid tight seal between said housing and said shaft during said pumping operation, a dynamic seal arrangement for providing a seal between said pump housing and said shaft, said seal arrangement comprising:*

*(a) an axially movable primary seal ring adapted to be disposed annularly about said shaft and secured in fluid tight relation to one of said shaft and said housing, said primary seal ring defining a radial seal face;*

*(b) a stationary mating seal ring adapted to be disposed annularly about said shaft and secured in fluid tight relation to the other of said shaft and said housing, said mating seal ring defining a radial seal face adapted for sealing contact with said radial seal face of said primary seal ring;*

*wherein one of said radial faces of one said seal ring defines a smooth surface and the radial seal face of said other seal ring defines a surface having a plurality of spiral grooves therein, said faces being exposed to the fluid within the pump at one circumferential periphery and to the atmosphere external to the pump at the opposite circumferential periphery, said grooves extending from said circumferential periphery exposed to atmosphere external to the pump radially partially toward the other circumferential periphery thereof and terminating to define on said surface of said radial face, between said grooves and said circumferential periphery exposed to the fluid within the pump a sealing dam adapted to sealingly engage said smooth radial free of said other of said seal rings;*

*biasing means urging said axially movable ring toward said stationary mating seal ring to cause said dam to engage said radial face of said other ring when said pump shaft is not rotating;*

*said grooves pumping atmosphere between said faces when said pump shaft is rotating at operational speed at a pressure to separate said radial faces of said seal rings.*

*10. In a pump, the seal arrangement of claim 9 wherein the width of said spiral grooves converges as they extend from said circumferential periphery toward said other circumferential periphery.*

*11. In a pump, the seal arrangement of claim 9 wherein said stationary ring is secured in fluid tight relation with said housing.*

*12. In a pump, the seal arrangement of claim 9 wherein said axially movable ring is secured in fluid tight relation with said shaft.*

*13. In a pump, the seal arrangement of claim 9 including an annular seal housing disposed about said shaft and defining s seal housing cavity within which said seal arrangement is disposed, said seal housing connectable to said pump housing.*

*14. In a pump, the seal arrangement of claim 9 wherein said seal housing defines a radial wall defining an annular opening about said shaft to vent said seal housing cavity to atmosphere.*

*15. In a pump, the seal arrangement of claim 9 including a retaining element associated with said primary seal ring and retaining said primary seal ring therein, said retaining element disposed annularly about and rotatable with said shaft and defining a plurality of bores, each said bore having seated therein a spring, said spring adapted to bias said primary seal ring into engagement with said mating seal ring to provide a static seal.*

*16. In a pump including a rotatable shaft, an impeller on said shaft to pressurize fluid during rotation of said shaft, a pump housing defining a seal cavity surrounding the shaft, a dynamic seal arrangement for providing a seal between said pump housing and said shaft, said seal arrangement comprising:*

*(a) an axially movable primary seal ring adapted to be disposed annularly about said shaft and secured in fluid tight relation to one of said shaft and said housing, said primary seal ring defining a radial seal face;*

*(b) a stationary mating seal ring adapted to be disposed annularly about said shaft and secured in fluid tight relation to the other of said shaft and said housing, said mating seal ring defining a radial seal face adapted for sealing contact with said radial seal face of said primary seal ring;*

*wherein one of said radial faces of one said seal ring defines a smooth surface and the radial seal face of said other seal ring defines a surface having a plurality of spiral grooves therein, said faces being exposed to the fluid within the pump at one circumferential periphery and to the atmosphere external to the pump at the opposite circumferential periphery, said grooves extending from said circumferential periphery exposed to atmosphere external to the pump radially partially toward the other circumferential periphery thereof and terminating to define on said surface of said radial face, between said grooves and said circumferential periphery exposed to the fluid within the pump a sealing dam adapted to sealingly engage said smooth radial face of said other of said seal rings;*

*biasing means urging said axially movable ring toward said stationary mating seal ring to cause said dam to engage said radial face of said other ring when said pump shaft is not rotating;*

*said grooves pumping atmosphere between said faces when said pump shaft is rotating at operational speed at a pressure to separate said radial faces of said seal rings.*

*17. In a pump, the seal arrangement of claim 16 wherein the width of said spiral grooves converges as they extend from said circumferential periphery toward said other circumferential periphery.*

*18. In a pump, the seal arrangement of claim 16 wherein said stationary ring is secured in fluid tight relation with said housing.*

*19. In a pump, the seal arrangement of claim 16 wherein said axially movable ring is secured in fluid tight relation with said shaft.*

*20. In a pump, the seal arrangement of claim 16 including an annular seal housing disposed about said shaft and defining s seal housing cavity within said seal arrangement is disposed, said seal housing connectable to said pump housing.*

*21. In a pump, the seal arrangement of claim 16 wherein said seal housing defines a radial wall defining an annular opening about said shaft to vent said seal housing cavity to atmosphere.*

*22. In a pump, the seal arrangement of claim 16 including a retaining element associated with said primary seal ring and retaining said primary seal ring therein, said retaining element disposed annularly about and rotatable with said shaft and defining a plurality of bores, each said bore having seated therein a spring, said spring adapted to bias said primary seal ring into engagement with said mating seal ring to provide a static seal.*

* * * * *